US012689067B2

(12) United States Patent
Choi et al.

(10) Patent No.: US 12,689,067 B2
(45) Date of Patent: Jul. 21, 2026

(54) BOARD TYPE ESS BATTERY PACK

(71) Applicant: LG ENERGY SOLUTION, LTD., Seoul (KR)

(72) Inventors: Hyoung-Sik Choi, Daejeon (KR); Ki-Woong Kim, Daejeon (KR); In-Gu An, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 687 days.

(21) Appl. No.: 17/926,732

(22) PCT Filed: Sep. 17, 2021

(86) PCT No.: PCT/KR2021/012851
§ 371 (c)(1),
(2) Date: Nov. 21, 2022

(87) PCT Pub. No.: WO2022/124539
PCT Pub. Date: Jun. 16, 2022

(65) Prior Publication Data
US 2023/0207896 A1    Jun. 29, 2023

(30) Foreign Application Priority Data
Dec. 7, 2020    (KR) ........................ 10-2020-0169717

(51) Int. Cl.
*H01M 10/42* (2006.01)
*H01M 50/211* (2021.01)
(Continued)

(52) U.S. Cl.
CPC ....... *H01M 10/425* (2013.01); *H01M 50/211* (2021.01); *H01M 50/244* (2021.01);
(Continued)

(58) Field of Classification Search
None
See application file for complete search history.

(56) References Cited

U.S. PATENT DOCUMENTS

| 10,070,559 | B2 | 9/2018 | Kim | |
| 10,833,302 | B2 * | 11/2020 | Nguyen | ................ H01M 50/24 |

(Continued)

FOREIGN PATENT DOCUMENTS

| CN | 105529422 A | 4/2016 |
| CN | 105789543 A | 7/2016 |

(Continued)

OTHER PUBLICATIONS

International Search Report for PCT/KR2021/012851 (PCT/ISA/210) mailed on Jan. 3, 2022.

(Continued)

*Primary Examiner* — Maria Laios
(74) *Attorney, Agent, or Firm* — Birch, Stewart, Kolasch & Birch, LLP

(57) ABSTRACT

An energy storage system (ESS) battery pack includes a battery module having a plurality of battery cells and a cell housing provided in a hollow board shape to accommodate the plurality of battery cells therein; and a system module disposed on a lower portion of the battery module and including a battery management system, and a box-shaped system housing including a docking unit formed to accommodate the battery management system in one side of an inside and vertically insert a lower end of the cell housing into the other side. When the cell housing is lifted from the docking unit, the battery module is provided to be separated from the system module.

8 Claims, 8 Drawing Sheets

(51) Int. Cl.
　　H01M 50/244　　(2021.01)
　　H01M 50/251　　(2021.01)
　　H01M 50/296　　(2021.01)
(52) U.S. Cl.
　　CPC ....... H01M 50/251 (2021.01); H01M 50/296
　　　　(2021.01); *H01M 2010/4271* (2013.01)

(56)　　　　　　References Cited

U.S. PATENT DOCUMENTS

| | | | |
|---|---|---|---|
| 2009/0214936 A1* | 8/2009 | Yang .................. H01M 50/569 429/61 |
| 2012/0301758 A1 | 11/2012 | Lu |
| 2014/0199570 A1 | 7/2014 | Cho |
| 2015/0044512 A1 | 2/2015 | Kawaguchi et al. |
| 2015/0303419 A1 | 10/2015 | Hachiya et al. |
| 2016/0249908 A1 | 9/2016 | Shelton, IV et al. |
| 2017/0162843 A1* | 6/2017 | Schupp ................ H05K 5/0221 |
| 2017/0200929 A1 | 7/2017 | Acikgoez et al. |
| 2022/0059895 A1* | 2/2022 | Pan ..................... H01M 50/264 |

FOREIGN PATENT DOCUMENTS

| CN | 106471647 A | 3/2017 | | |
|---|---|---|---|---|
| CN | 108011055 A | 5/2018 | | |
| CN | 208889801 U | 5/2019 | | |
| CN | 211184575 U | 8/2020 | | |
| CN | 111900502 A | * 11/2020 | .......... H01M 50/296 |
| JP | 2014-116110 A | 6/2014 | | |
| JP | 2018-516036 A | 6/2018 | | |
| JP | 2019-149357 A | 9/2019 | | |
| KR | 10-2012-0100712 A | 9/2012 | | |
| KR | 10-2013-0136744 A | 12/2013 | | |
| KR | 10-1349154 B1 | 1/2014 | | |
| KR | 10-2014-0092656 A | 7/2014 | | |
| KR | 10-2014-0134886 A | 11/2014 | | |
| KR | 10-2017-0025073 A | 3/2017 | | |
| KR | 10-1799537 B1 | 11/2017 | | |
| KR | 10-2018-0006581 A | 1/2018 | | |
| KR | 10-1987805 B1 | 6/2019 | | |
| KR | 10-2097779 B1 | 4/2020 | | |
| KR | 10-2098946 B1 | 4/2020 | | |
| KR | 10-2020-0132711 A | 11/2020 | | |
| WO | WO 2013/137446 A1 | 9/2013 | | |
| WO | WO 2014/073524 A1 | 5/2014 | | |

OTHER PUBLICATIONS

Extended European Search Report for European Application No. 21903586.2, dated Aug. 23, 2024.

* cited by examiner

1

Prior Art

BOARD TYPE ESS BATTERY PACK

TECHNICAL FIELD

The present disclosure relates to an energy storage system (ESS) battery pack, and more particularly, to an ESS battery pack that is suitable for home use, easy to maintain and replace components, and has a slim structure.

The present application claims priority to Korean Patent Application No. 10-2020-0169717 filed on Dec. 7, 2020 in the Republic of Korea, the disclosure of which is incorporated herein by reference.

BACKGROUND ART

An energy storage system (ESS) battery pack is equipped with secondary battery cells to store power during the day and take out and use the power when needed. For example, the ESS battery pack is in the form of storing electricity generated using solar panels or wind power generation in secondary battery cells and then taking out and using the electricity.

The ESS battery pack 1 may be configured differently in size and weight depending on the storage capacity. For example, a home ESS battery pack has a rectangular box shape of about 120×80×20 cm (height×width×thickness), as shown in FIG. 1 and weighs approximately 100 kg. The home ESS battery pack may be installed on a wall or pole indoors or outdoors by using a bracket, etc.

The home ESS battery pack according to the related art as described above is bulky and heavy for a user to transport and install alone. That is, the home ESS battery pack according to the related art is difficult for the user to directly install or reinstall by changing the position.

In addition, because the home ESS battery pack according to the related art has a structure in which all components are integrated in one pack case, when a problem occurs in some of the components, it is difficult to repair or replace the components. For example, even if there is a defect in a battery cell or a battery management system, it is extremely difficult for a general user to directly replace the battery cell or the battery management system.

Accordingly, there is an increasing demand for a new type of home ESS battery pack capable of further facilitating convenience of installation, maintenance, and replacement of components for users.

DISCLOSURE

Technical Problem

The present disclosure is designed to solve the problems of the related art, and therefore the present disclosure is directed to providing a home energy storage system (ESS) battery pack having a structure that is easy to install and easy to maintain and replace components after use.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an energy storage system (ESS) battery pack including at least one battery module including a plurality of battery cells and a cell housing provided in a hollow board shape to accommodate the plurality of battery cells therein; and a system module disposed on a lower portion of the at least one battery module and including a battery management system, and a box-shaped system housing including a system receiver formed to accommodate the battery management system in a first side and at least one docking unit to vertically insert a lower end of the cell housing into a second side, wherein when the at least one battery module is lifted from the at least one docking unit, the at least one battery module is provided to be separated from the system module.

The battery cells may be pouch-type battery cells, and a thickness of the cell housing may correspond to a thickness of one of the pouch-type battery cells.

The lower end of the cell housing may be inserted straight into the at least one docking unit by a predetermined depth and may be vertically disposed with respect to an upper surface of the system module.

The at least one battery module may further include a connector disposed on the lower end of the cell housing, and the at least one docking unit may include a guide barrier wall configured to guide the lower end of the cell housing to be vertically inserted; and a terminal member electrically connected to and in contact with the connector.

The connector may include a connector housing provided inside the lower end of the cell housing; and a plug vertically protruding to outside the lower end of the cell housing, and the terminal member may include a socket portion provided in a groove shape matching the plug; a spring interposed inside the socket portion; and a metal plate provided on an upper end of the spring.

The terminal member and the battery management system may be connected to each other by a metal wire, and the metal wire may have a first side connected to the spring and a second side connected to the battery management system, and may pass through the guide barrier wall.

The system receiving unit may be partitioned from the at least one docking unit by the guide barrier wall.

The system receiver may include two parts connected to each other by a hinge to surround the battery management system, and one of the two parts may be opened and closed by rotating with respect to the hinge as an axis The cell housing may include a housing body having an open surface, and including supporters capable of supporting the plurality of battery cells in multiple steps inside; and a housing cover hinge-coupled to an upper end of the housing body to be rotatable and formed to open and close the open surface of the housing body.

The at least one battery module may be a plurality of battery modules, and the at least one docking unit may be a plurality of docking units capable of inserting a respective one of the plurality of battery modules.

Advantageous Effects

According to an aspect of the present disclosure, the home energy storage system (ESS) battery pack having the structure that is easy to install and easy to maintain and replace components after use may be provided.

The home ESS battery pack of the present disclosure is easy to handle by the user because the battery module and the system module may be individually transported and simply assembled. Also, for example, when the battery cell or the control system component has a defect, it is possible to facilitate repair and replacement of the corresponding component.

In addition, by developing a new version of battery module compatible with the existing system module, it is possible to remove an old version of battery module and replace the old version of battery module with the new version of battery module. Conversely, it is also possible to exchange only the system module with a new system module.

The effects of the present disclosure are not limited to the above-described effects, and the effects not mentioned will be clearly understood by those of ordinary skill in the art to which the present disclosure belongs from the present specification and the accompanying drawings.

MODE OF DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
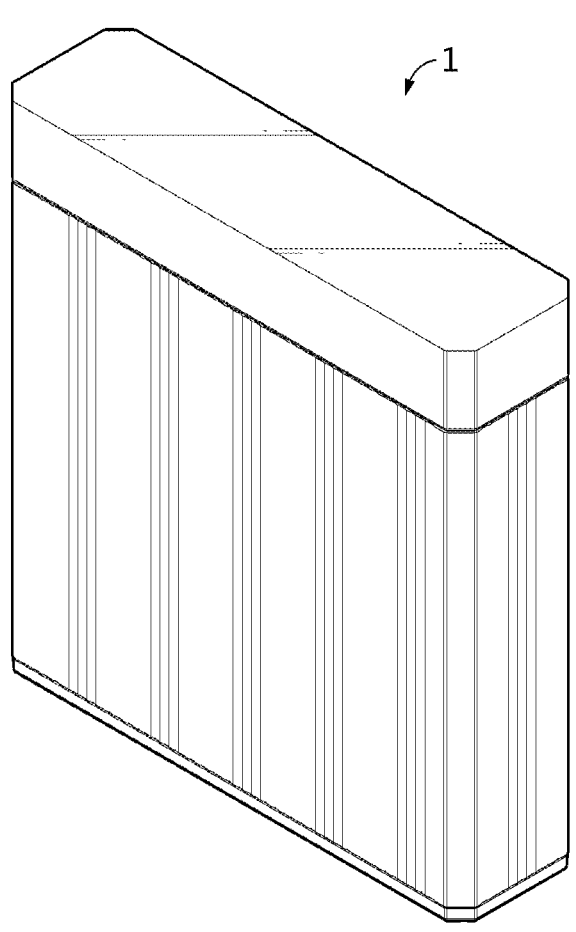
FIG. 1 is a schematic perspective view of a home energy storage system (ESS) battery pack according to the related art.
Figure 2:
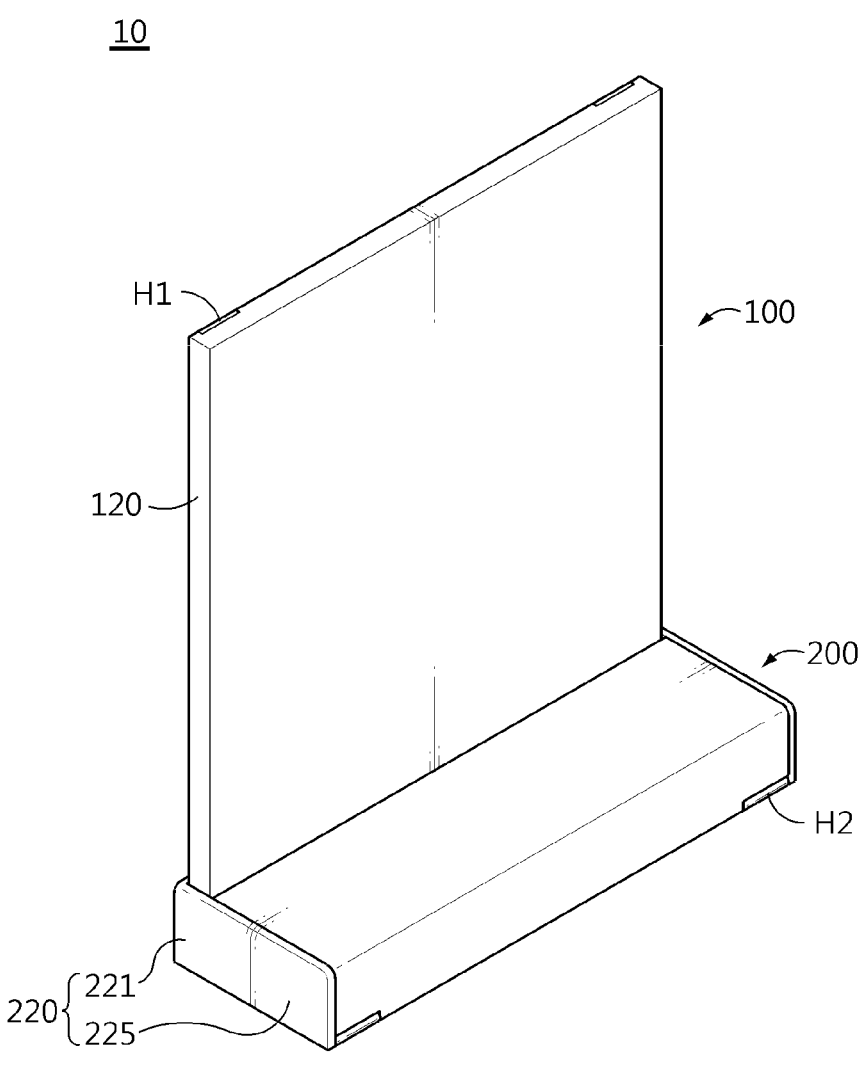
FIG. 2 is a schematic perspective view of a home energy storage system (ESS) battery pack according to an embodiment of the present disclosure.
Figure 3:
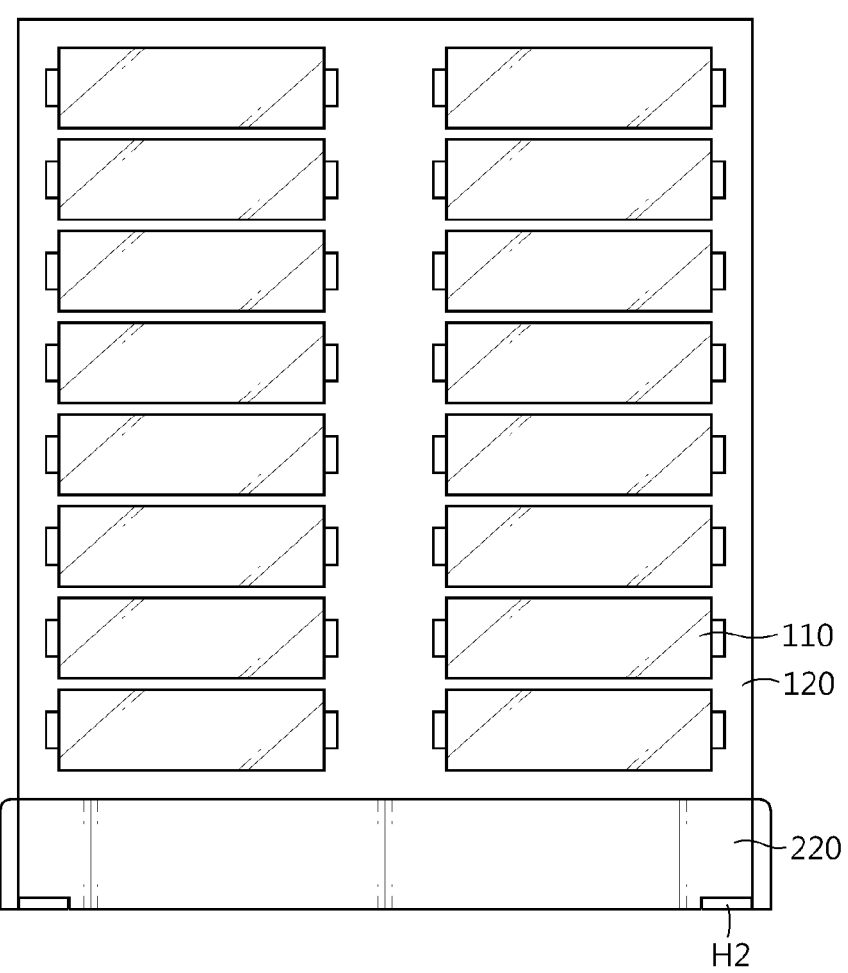
FIG. 3 is a diagram for explaining a battery cell accommodation structure of the ESS battery pack according to an embodiment of the present disclosure.
Figure 4:
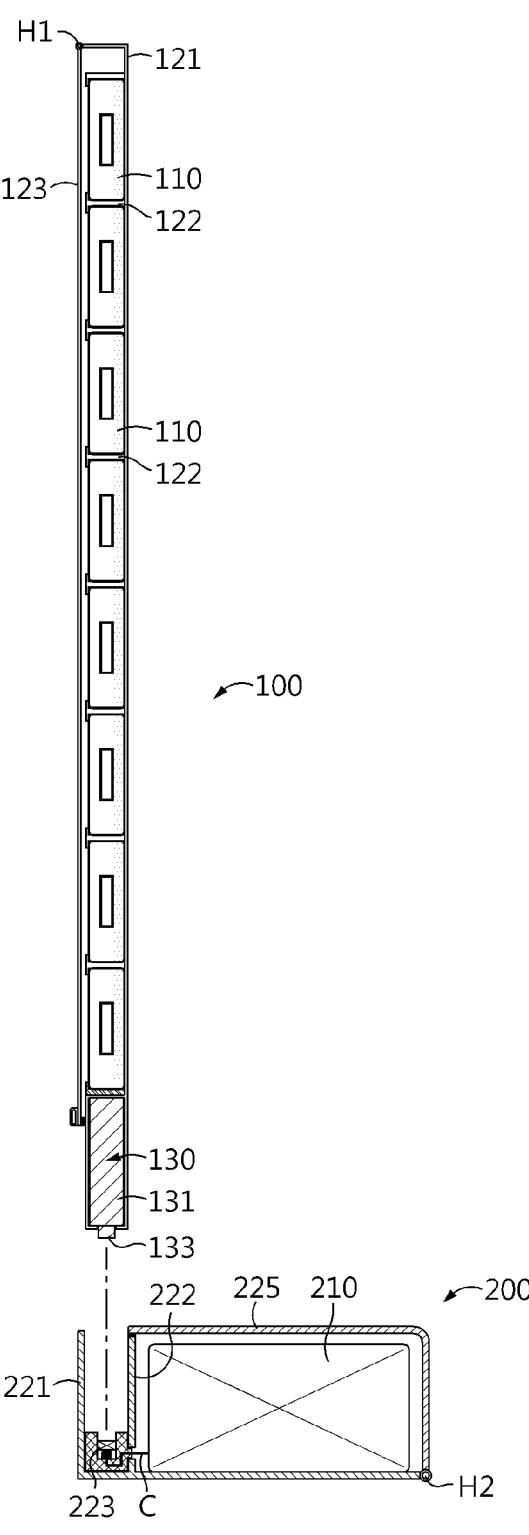
FIGS. 4 and 5 are diagrams illustrating before and after a connection of a battery module and a system module constituting the ESS battery pack according to an embodiment of the present disclosure.
Figure 5:
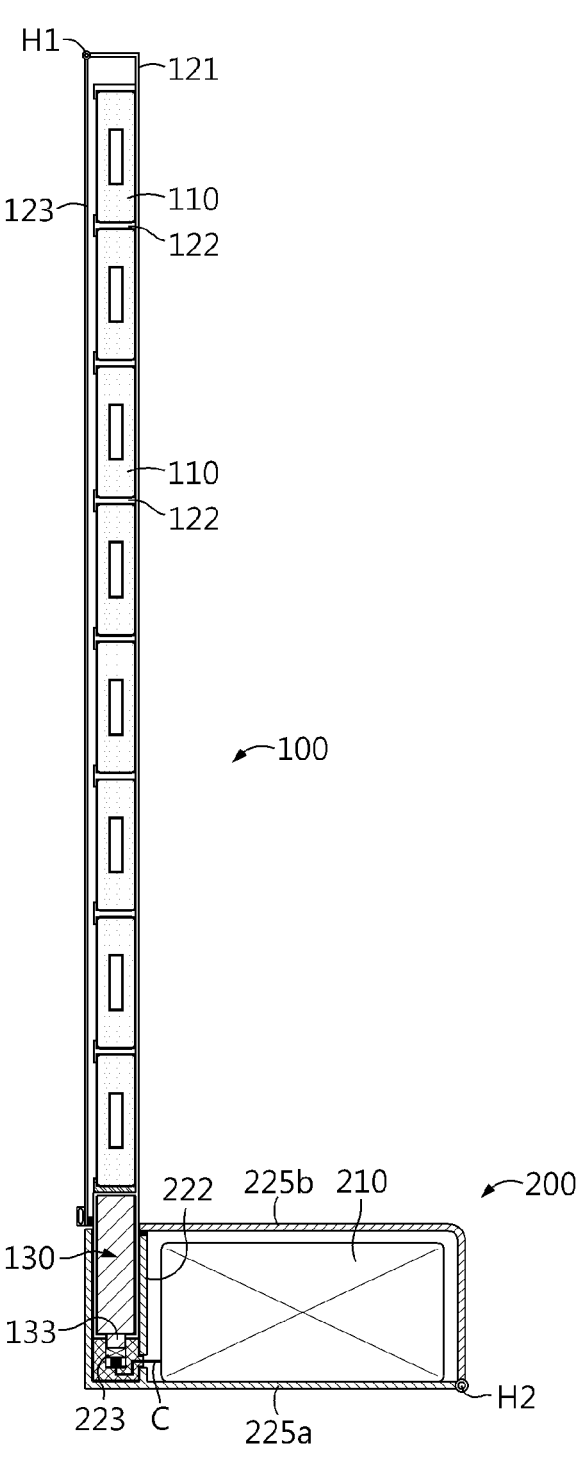

FIG. 2 is a schematic perspective view of a home energy storage system (ESS) battery pack according to an embodiment of the present disclosure, FIG. 3 is a diagram for explaining a battery cell accommodation structure of the ESS battery pack according to an embodiment of the present disclosure, and FIGS. 4 and 5 are diagrams illustrating before and after a connection of a battery module and a system module constituting the ESS battery pack according to an embodiment of the present disclosure.

Referring to these drawings, an ESS battery pack 10 according to an embodiment of the present disclosure includes a battery module 100 and a system module 200 that are electrically and mechanically connected to each other in a detachable manner.

As will be described below in detail, the ESS battery pack 10 according to the present disclosure is configured such that the battery module 100 and the system module 200 are connected to or disconnected from each other in the manner that the battery module 100 is inserted into and taken out from a docking unit 221 of the system module 200, and thus, the installation convenience of a user is excellent and when a new version of the battery module 100 is developed, an old version of the battery module 100 may be removed and the new version of the battery module 100 may be inserted into the system module 200 to be replaced.

The main components of the battery module 100 and the system module 200 will be described below.

The battery module 100 includes a plurality of battery cells 110, a cell housing 120, and a connector 130.

The pouch-type battery cell 110 is applied as the battery cell 110 of the present embodiment. The pouch-type battery cell 110 has a high energy density and is in a flat rectangular plate shape to be easily accommodated in a board-shaped cell housing 120 that will be described below.

The pouch-type battery cell 110 includes an electrode assembly, an electrolyte, and a pouch sheath material for packaging the electrode assembly and the electrolyte. The electrode assembly is formed as a stack in which a structure of positive electrode plate-separator-negative plate structure is repeated, and each positive plate and each negative plate includes an electrode tab. One or more electrode tabs are connected to electrode leads inside the pouch sheath material and the electrode leads extend to be disposed to the outside of the pouch sheath material, and accordingly, function as electrode terminals of the battery cell 110.

The pouch sheath material is for sealing and accommodating the electrode assembly and the electrolyte, and in order to supplement electrochemical properties of the electrode assembly and the electrolyte and improve heat dissipation, may be configured to include a metal thin film, for example, an aluminum thin film. The aluminum thin film may be interposed between an insulating layer formed of an insulating material to secure electrical insulation and an inner adhesive layer.

However, the scope of the present disclosure should not be limited to using the pouch-type battery cell 110. As the battery cell 110, other types of battery cells 110 such as a cylindrical battery cell 110 having a sheath material formed of a metal can, a polygonal battery cell 110, etc. may be used.

The cell housing 120 is provided in a hollow board shape. The battery cells 110 may be arranged in a predetermined pattern in an inner space of the cell housing 120 and may be connected in series and/or parallel to each other via a bus bar (not shown) or a wire (not shown).

The cell housing 120 may be configured to have a thickness corresponding to the thickness of the battery cell 110 and an area in which at least two battery cells 110 may be arranged side by side in a horizontal or vertical direction on the same plane. For example, when the pouch-type battery cell 110 having a thickness of less than 30 mm is used, the cell housing 120 may be manufactured to have a thickness of about 30 mm and an area in which the battery cells 110 may be arranged in two columns, as shown in FIG. 3.

As described above, the cell housing 120 is manufactured in a thin board type, only the battery cells 110 and basic wiring materials are accommodated in the cell housing 120, and electric components for controlling charging and discharging of the battery cells 110, the flow of current, the size, etc. such as the battery management system 210, a power relay, a DC/DC converter, etc. are separately embedded in the system module 200, and thus the battery module 100 may be lightweight and slim in the thin board type.

The cell housing 120 according to the present embodiment may include a housing body 121 and a housing cover 123.

Figure 6:
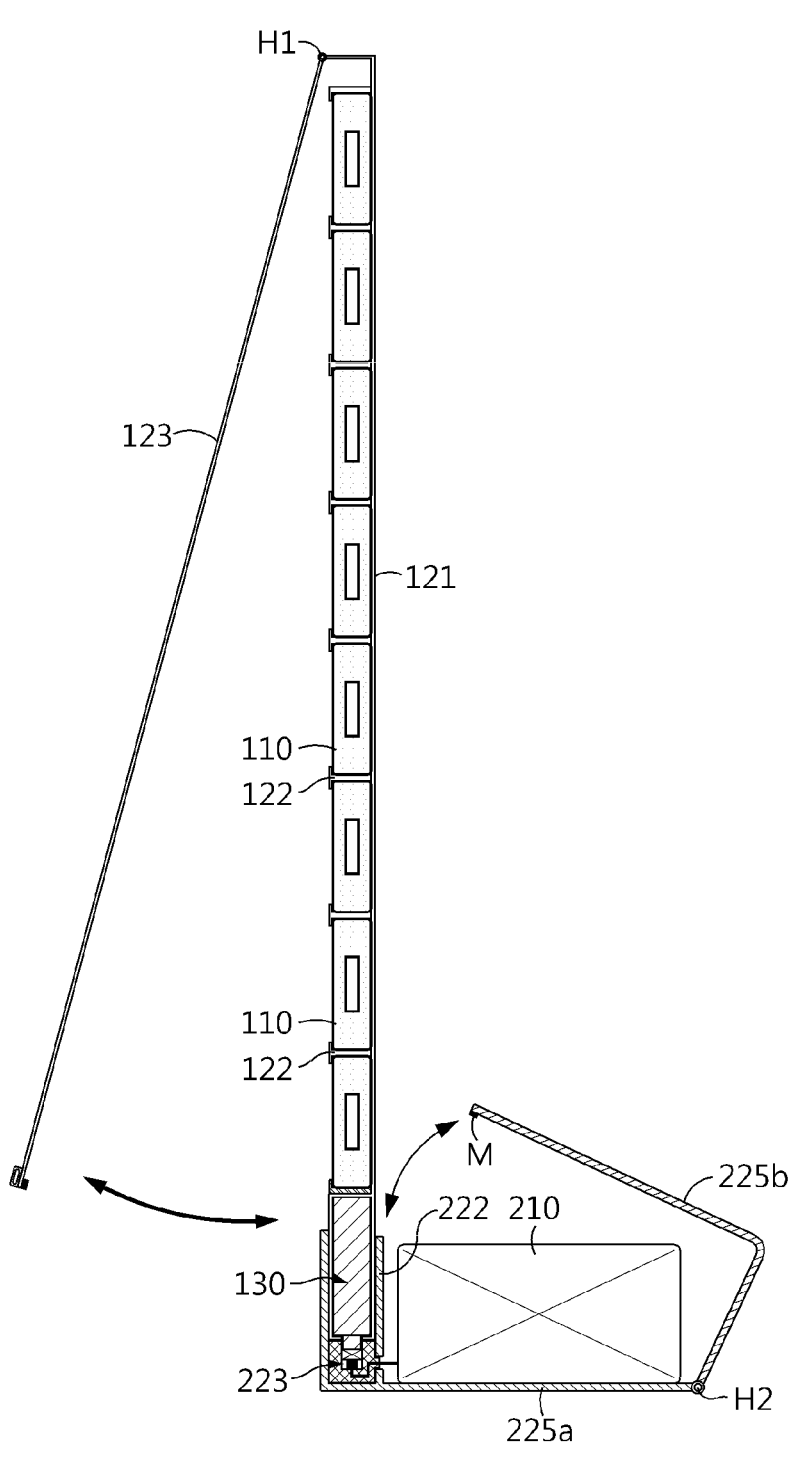
FIG. 6 is a diagram illustrating an opening and closing structure of a battery module and a system module according to an embodiment of the present disclosure.

Referring to FIGS. 4 to 6, the housing body 121 has a hollow rectangular parallelepiped board shape and includes supporters 122 capable of supporting the battery cells 110 one by one in multiple steps. The housing body 121 may be provided such that at least a part of one surface is opened, and an opening portion of the housing body 121 may be configured to be opened and closed by a housing cover 123. For example, the housing cover 123 may be coupled to the housing body 121 in a sliding or rotational manner to open and close the opening portion. In the present embodiment, the housing cover 123 is coupled to an upper end of the housing body 121 with a hinge H1 and rotated to open and close the opening portion. When the housing cover 123 is opened, a handle 123a may be added to one side of the housing cover 123 to facilitate rotation.

The supporters 122 protruding in an approximately "T" shape at a regular interval in a height direction may be provided on an inner wall surface of the housing body 121, and the battery cells 110 may be fixed by being sandwiched between the supports 122. At this time, one (wide) surface of the battery cell 110 may be in contact with the inner wall surface of the housing body 121, and both side portions and an edge portion of the other (wide) surface thereof may be held by being surrounded with the T-shaped two supporters 122.

The connector 130 for connecting the battery module 100 to the system module 200 may be provided on a lower end of the cell housing 120.

As shown in FIG. 4, the connector 130 includes a connector housing 131 and a plug 133. Here, the connector housing 131 is an injection molded product surrounding the plug 133 and is a component for fixing and protecting the plug 133, and the plug 133 is a conductor and is a component that functions as a terminal connected to a terminal member 223 that will be described below.

The connector housing 131 may be fixedly assembled inside the lower end of the cell housing 120, and the plug 133 may extend over the inside and outside of the connector housing 131. One end of the plug 133 may vertically protrude downward to the outside of the lower end of the cell housing 120 in the connector housing 131. Although not shown, a cable may be attached to the other end of the plug 133 located inside the connector housing 131. The cable may be wired in contact with the battery cell 110 or a bus bar (not shown) connected to electrode leads of the battery cells 110. A plurality of cables may be provided, and the plurality of cables may be divided into a power cable and a signal cable. The plug 133 may be provided by the number corresponding to the plurality of cables.

The system module 200 includes a battery management system 210 and a box-shaped system housing 220 having an internal space that may accommodate the battery management system 210.

The battery management system 210 is a component that monitors state of the battery cells 110 and manages charging and discharging, and may be provided as a printed circuit board optionally including a processor, an application-specific integrated circuit (ASIC), another chipset, a logic circuit, a register, a communication modem, a data processing device, etc. known in the art. In addition to the battery management system 210, a battery disconnect unit may also be accommodated in the system housing 220. Here, the battery disconnect unit is one of power control components, includes a relay, a current sensor, a resistor, etc., and collectively refers to a component that connects or disconnects power between a battery and a load.

That is, the system housing 220 may be equipped with electric components necessary for managing the charging/discharging state of the battery cells 110 and controlling power.

Figure 7:
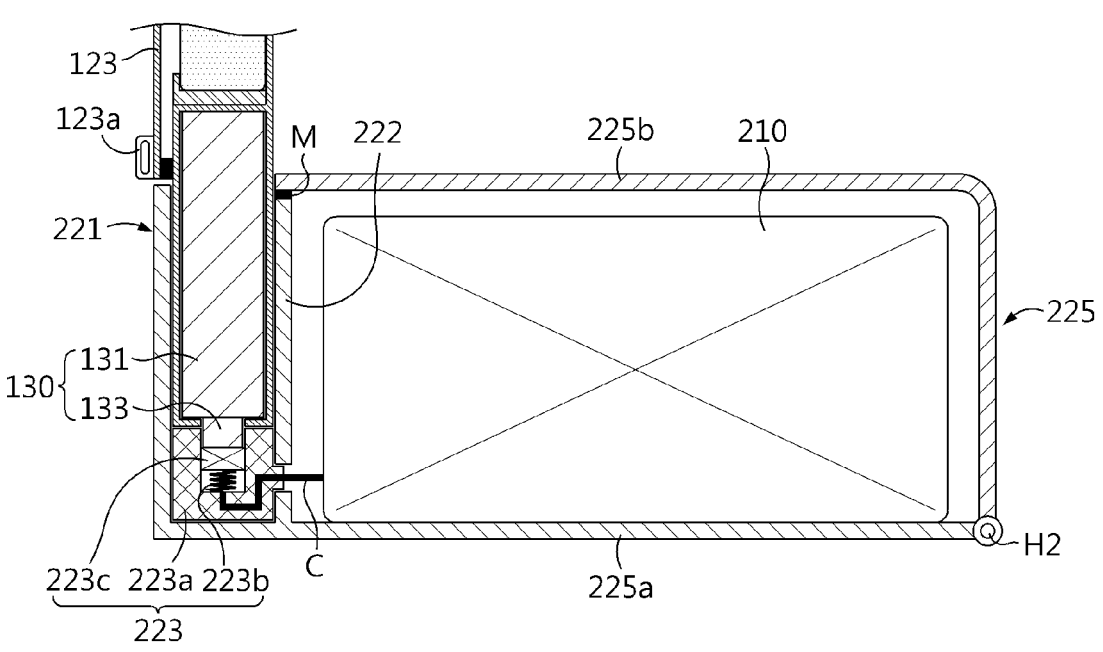
FIG. 7 is a partially enlarged view of FIG. 5.

Specifically, referring to FIGS. 4 and 6 to 7, with regard to the configuration of the system housing 220 according to the present embodiment, the system housing 220 includes the docking unit 221 and a system receiving unit 225.

The docking unit 221 is provided such that the lower end of the cell housing 120 of the battery module 100 may be straightly and vertically inserted by a predetermined depth. In the present embodiment, the system housing 220 may be divided into the docking unit 221 at the left edge and the system receiving unit 225 at the right side of the docking unit 221. The docking unit 221 and the system receiving unit 225 may be partitioned by a guide barrier wall 222.

The docking unit 221 has an upper portion opened so that the lower end of the cell housing 120 may be inserted, and front, rear, left, right side portions and a lower portion surrounded by walls so that an accommodation space for accommodating the lower end of the cell housing 120 is formed. Here, the wall forming the right side portion may be configured as the guide barrier wall 222.

In addition, the terminal member 223 electrically connected to the plug 133 in contact with the connector 130 may be provided on a bottom surface of the docking unit 221. The terminal member 223 may include a socket portion 223a, a spring 223b, and a metal plate 223c.

The socket portion 223a may be provided in a groove shape matching the plug 133 of the connector 130, and the spring 223b may be interposed inside the socket portion 223a. The metal plate 223c may be attached to an upper end of the spring 223b, and a metal wire C may be attached to a lower end of the spring 223b.

The metal plate 223c may be disposed on an upper end of the spring 223b so that a plate surface faces in an upper direction to make face-to-face contact with the plug 133. A part of the metal wire C may be embedded in the socket portion 223a and may be connected to the battery management system 210 through the guide barrier wall 222.

The system receiving unit 225 may be partitioned from the docking unit 221 by the guide barrier wall 222 and may be provided in the shape of a box having an internal space capable of accommodating the battery management system 210, etc.

In the present embodiment, the system receiving unit 225 may surround the battery management system 210 and include a fixing part 225a and a rotating part 225b connected by a hinge H2. The system receiving unit 225 may be opened and closed by rotating the rotating part 225b in a forward and reverse direction with respect to the fixing part 225a by using the hinge H2 as an axis. The end of the rotating part 225b may be placed on an upper end of the guide barrier wall 222, and at this time, a magnet M may be attached to the end of the rotating part 225b and the upper end of the guide barrier wall 222 so that the fixing part 225a and the rotating part 225b are stably attached/detached.

According to the above configuration, for example, when a problem occurs in any electric component including the battery management system 210 and repair or replacement is required, the rotating part 225*b* may be opened to repair or replace the corresponding component.

Next, an example of the installation of the ESS battery pack 10 according to the present embodiment will be briefly described as follows.

The battery module 100 and the system module 200 may be separately manufactured and assembled at a position where the battery module 100 and the system module 200 are to be installed. Assembly of the battery module 100 and the system module 200 is very simple. First, the position where the system module 200 is to be installed is determined, and the system module 200 is horizontally fixed to the corresponding position using, for example, bolts or pieces. Then, as shown in FIGS. 4 and 5, when the lower end of the cell housing 120 is inserted into the docking unit 221 of the system housing 220, the battery module 100 and the system module 200 may be connected to each other.

When the battery module 100 and the system module 200 are to be separated from each other, the lower end of the cell housing 120 is simply lifted from the docking unit 221.

Meanwhile, when there is a problem in the battery cell 110, the battery module 100 may be removed from the system module 200 to replace the corresponding battery cell 110. For example, the corresponding battery cell 110 is replaced with a new one by removing the battery module 100, then laying the cell housing 120 on the ground, opening the housing cover 123, and removing the corresponding battery cell 110 from the inside of the housing body 121.

In addition, when there is a problem in the battery management system 210, the power is disconnected when the battery module 100 is removed from the system housing 220. At this time, the system receiving unit 225 may be opened and the existing battery management system may be safely replaced with the new battery management system 210.

In addition, when a new version of the battery module 100 compatible with the existing system module 200 is developed, it is also possible to remove an old version of the battery module 100 and replace the version of the battery module 100 with the new version of the battery module 100. Conversely, it is also possible to exchange only the system module 200 with the new system module 200.

Figure 8:
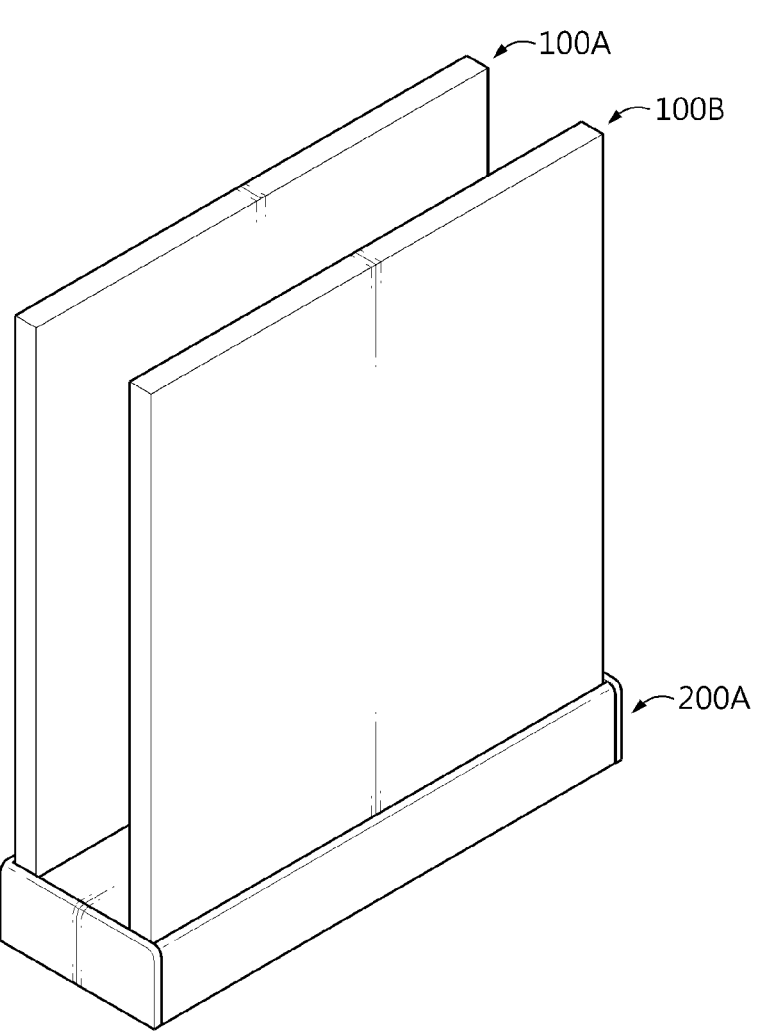
FIG. 8 is a schematic perspective view of an ESS battery pack according to another embodiment of the present disclosure.

FIG. 8 is a schematic perspective view of an ESS battery pack according to another embodiment of the present disclosure.

The ESS battery pack according to another embodiment of the present disclosure will be described with reference to FIG. 8. A redundant description of the same configuration as in the above-described embodiment will be omitted and only differences will be briefly described.

The ESS battery pack according to another embodiment of the present disclosure includes two or more battery modules 100A and 100B and a system module 200A. For example, as shown in FIG. 8, the ESS battery pack 10 may be configured to vertically insert each of the two battery modules 100A and 100B into the system module 200A. To this end, two docking units 221 may be provided in the system module 200. In the present embodiment, the ESS battery pack 10 includes the two battery modules 100 and the two docking unit 221 of the system module 200A, but unlike the present embodiment, the ESS battery pack 10 may include three or four battery modules, and, in this case, the ESS battery pack 10 may also include three or four docking unit 221 of the system module 200.

If the ESS battery pack according to another embodiment of the present disclosure is used, the energy storage capacity may be easily increased by adding the battery module 100 if necessary. That is, the ESS battery pack according to another embodiment of the present disclosure has not only convenience of installation of the user but also capacity expandability.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, although the terms indicating directions such as up, down, left, right, front, and back are used herein, these terms are only for convenience of description, and it is obvious to one of ordinary skill in the art that the terms may vary depending on the location of a target object or the location of an observer.

What is claimed is:

1. An energy storage system (ESS) battery pack comprising:

at least one battery module comprising a plurality of battery cells and a cell housing provided in a hollow board shape to accommodate the plurality of battery cells therein; and a system module disposed on a lower portion of the at least one battery module and comprising a battery management system, and a box-shaped system housing comprising a system receiver formed to accommodate the battery management system in a first side and at least one docking unit to vertically insert a lower end of the cell housing in a second side laterally spaced from the first side, wherein when the at least one battery module is lifted from the at least one docking unit, the at least one battery module is provided to be separated from the system module, wherein the at least one battery module further comprises a connector disposed on the lower end of the cell housing, wherein the at least one docking unit comprises:

a guide barrier wall configured to guide the lower end of the cell housing to be vertically inserted; and a terminal member electrically connected to and in contact with the connector, wherein the connector comprises:

a connector housing provided inside the lower end of the cell housing; and a plug vertically protruding to outside the lower end of the cell housing, and wherein the terminal member comprises:

a socket portion provided in a groove shape matching the plug;

a spring interposed inside the socket portion; and a metal plate provided on an upper end of the spring.

2. The ESS battery pack of claim 1, wherein the battery cells are pouch-type battery cells, and wherein a thickness of the cell housing corresponds to a thickness of one of the pouch-type battery cells.

3. The ESS battery pack of claim 1, wherein the lower end of the cell housing is inserted straight into the at least one docking unit by a predetermined depth and is vertically disposed with respect to an upper surface of the system module.

4. The ESS battery pack of claim 1, wherein the terminal member and the battery management system are connected to each other by a metal wire, and wherein the metal wire has a first end connected to the spring and a second end connected to the battery management system, and passes through the guide barrier wall.

5. The ESS battery pack of claim 1, wherein the system receiver is partitioned from the at least one docking unit by the guide barrier wall.

6. The ESS battery pack of claim 1, wherein the at least one battery module is a plurality of battery modules, and wherein the at least one docking unit is a plurality of docking units capable of inserting a respective one of the plurality of battery modules.

7. An energy storage system (ESS) battery pack comprising:

at least one battery module comprising a plurality of battery cells and a cell housing provided in a hollow board shape to accommodate the plurality of battery cells therein; and a system module disposed on a lower portion of the at least one battery module and comprising a battery management system, and a box-shaped system housing comprising a system receiver formed to accommodate the battery management system in a first side and at least one docking unit to vertically insert a lower end of the cell housing in a second side laterally spaced from the first side, wherein when the at least one battery module is lifted from the at least one docking unit, the at least one battery module is provided to be separated from the system module, and wherein the system receiver comprises two parts connected to each other by a hinge to surround the battery management system, and one of the two parts is opened and closed by rotating with respect to the hinge as an axis.

8. An energy storage system (ESS) battery pack comprising:

at least one battery module comprising a plurality of battery cells and a cell housing provided in a hollow board shape to accommodate the plurality of battery cells therein; and a system module disposed on a lower portion of the at least one battery module and comprising a battery management system, and a box-shaped system housing comprising a system receiver formed to accommodate the battery management system in a first side and at least one docking unit to vertically insert a lower end of the cell housing in a second side laterally spaced from the first side, wherein when the at least one battery module is lifted from the at least one docking unit, the at least one battery module is provided to be separated from the system module, and wherein the cell housing comprises:

a housing body having an open surface, and comprising supporters capable of supporting the plurality of battery cells in multiple steps inside; and a housing cover hinge-coupled to an upper end of the housing body to be rotatable and formed to open and close the open surface of the housing body.

* * * * *